United States Patent
Tominaga

Patent Number: 5,392,733
Date of Patent: Feb. 28, 1995

[54] BOX-SHAPED TOILET FOR PET ANIMALS

[75] Inventor: Kazutoshi Tominaga, Higashiosakashi, Japan

[73] Assignee: Kabushiki Kaisha Tominaga Jyushi Kogyosho, Osaka, Japan

[21] Appl. No.: 202,949

[22] Filed: Feb. 28, 1994

[51] Int. Cl.⁶ .............................................. A01K 1/01
[52] U.S. Cl. ................................ 119/165; 119/166
[58] Field of Search ............... 119/15, 17, 165, 166, 119/167, 168, 169, 170, 138, 703

[56] References Cited

U.S. PATENT DOCUMENTS

| | | | |
|---|---|---|---|
| 3,233,588 | 2/1966 | Thomas | 119/166 |
| 3,831,557 | 8/1974 | Elesh | 119/170 |
| 3,885,523 | 5/1975 | Coleman | 119/165 |
| 3,890,930 | 6/1975 | Clark | 119/169 |
| 4,111,157 | 9/1978 | Haugen | 119/165 |
| 4,314,410 | 2/1992 | Nichols | 119/15 |
| 4,348,982 | 9/1982 | Selby | 119/168 |
| 4,522,150 | 6/1985 | Gershman | 119/165 |
| 4,926,794 | 5/1990 | Yamamoto | 119/165 |
| 5,134,974 | 8/1992 | Houser | 119/165 |
| 5,148,774 | 9/1992 | Fields | 119/165 |
| 5,167,205 | 12/1992 | Bell et al. | 119/168 |
| 5,220,885 | 6/1993 | Goetz | 119/165 |
| 5,249,549 | 10/1993 | Rockaitis, III | 119/165 |

*Primary Examiner*—Paul J. Hirsch
*Attorney, Agent, or Firm*—Collard & Roe

[57] ABSTRACT

A box-shaped toilet for allowing pet animals to excrete their body waste within the toilet, which has a base having an open top and accommodating a matting such as sand. The toilet further has a cover detachably attached to the base to define a space that the animals can enter and leave through at least one openings formed in the cover. This toilet is of such a structure that the waste and the matting are prevented from being scattered outwardly of the toilet.

11 Claims, 6 Drawing Sheets

BOX-SHAPED TOILET FOR PET ANIMALS

BACKGROUND OF THE INVENTION AND RELATED ART STATEMENT

The present invention relates to a box-shaped toilet for pet animals such as hamsters, mice, rabbits, cats and dogs, and more particularly relates to a toilet that is suitable as an equipment in a cage or housing for breeding hamsters or the like, and can be convenient for them to egest body wastes.

In a case wherein hamsters or the like pet animals are bred in a breeding cage to provide a joyful view of them, the cage will have some accessories equipped in addition to a feed box.

Some people make use of a shallow pan filled with sand, matting or the like and placed in the breeding cage, so that those animals may egest in a limited zone. This pan will facilitate removal of their body wastes.

It is however a problem that the pet animals will not necessarily egest in such a shallow pan. They often walk in the pan for fun and dig up or turn up the sand or matting, and sometimes kick it off the pan. In such an event, the sand or the like scattered together with the wastes will make the cage dirty, contrary to the breeders' expectation.

OBJECTS AND SUMMARY OF THE INVENTION

Therefore, an object of the present invention is to provide a box-shaped toilet for pet animals such as hamsters, mice, rabbits, cats, dogs and the like wherein the toilet is designed such that the animals may become used to egest their body wastes therein but cannot scatter the wastes and/or sand, matting or the like outwardly of the toilet.

The box-shaped toilet provided herein comprises a base and a cover detachably attached thereto to define a space for accommodation of the pet animal. The base has a closed bottom and an open top, and with the cover having openings through which the animal can enter and go out of the toilet.

In detail, the cover is of a cubic shape and has an open bottom releasably fixed to the base to form the space. In this space, the animal can egest its dung and/or urine.

Each of the base and the cover, both made of the same or different hard plastics, is an integral piece. It may be preferable that the plastics from which the cover is molded is transparent or translucent, so that any breeder or viewer can easily observe the animal present in the space.

It is also preferable for the cover to have a lower rim closely fittable on an upper rim of the base, for the. sake of a better appearance of the box-shaped toilet.

The cover may desirably have at least one locking portions that correspond to at least one lockable portions formed in or extending from the base. The locking and lockable portions are such that the cover can readily be attached to and detached from the base.

The base carrying the cover detachably mounted on it can be put into and taken out of the breeding cage. The cover may be disassembled from the base when cleaning it or putting away the animal's dung.

The openings as entrances and exits for the animals may penetrate opposite side walls of the cover of box-shaped toilet. Breeders may grip the cover, with their fingers hooking the openings, for convenient transportation of the toilet.

It is also desirable that each opening is surrounded by a bank-shaped rim protruding inwardly of the cover. This rim will prevent the sand or mat or the dung egested thereon from being freely scattered out of the toilet, though the animal is likely to dig or kick them by instinct.

Other objects and advantages of the invention will become apparent from the preferred embodiments described below. However, those embodiments do not restrict the scope of the invention but are modifiable without departing from the spirit thereof.

DETAILED DESCRIPTION OF THE PREFERRED EMBODIMENTS

The present invention will be described in detail referring to an illustrated embodiment that provides a preferable box-shaped toilet for hamsters.

Figure 1:
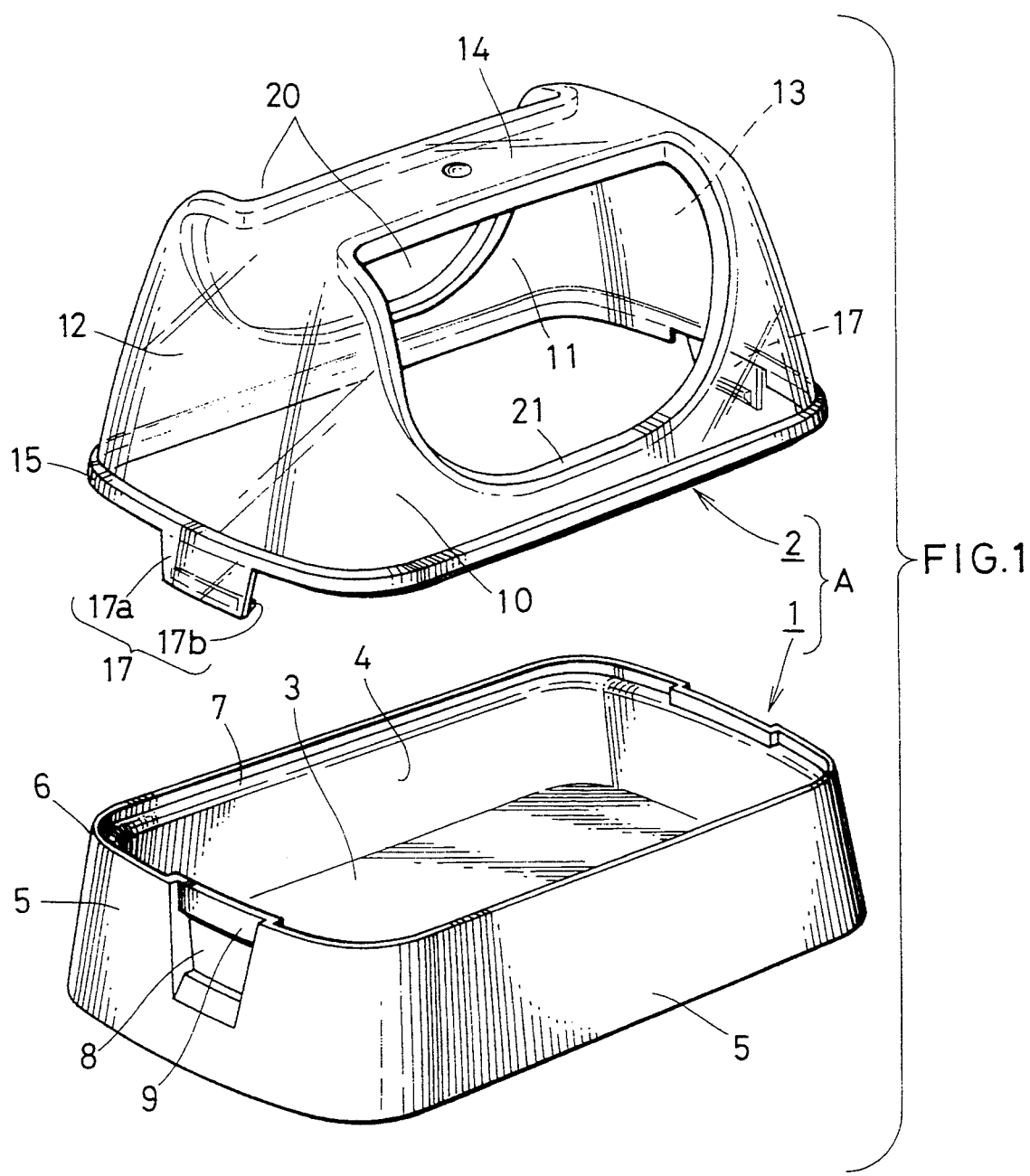
FIG. 1 is a perspective view generally showing a box-shaped toilet comprising a base disposed under a cover, which is in its state separated from the base.
Figure 2:
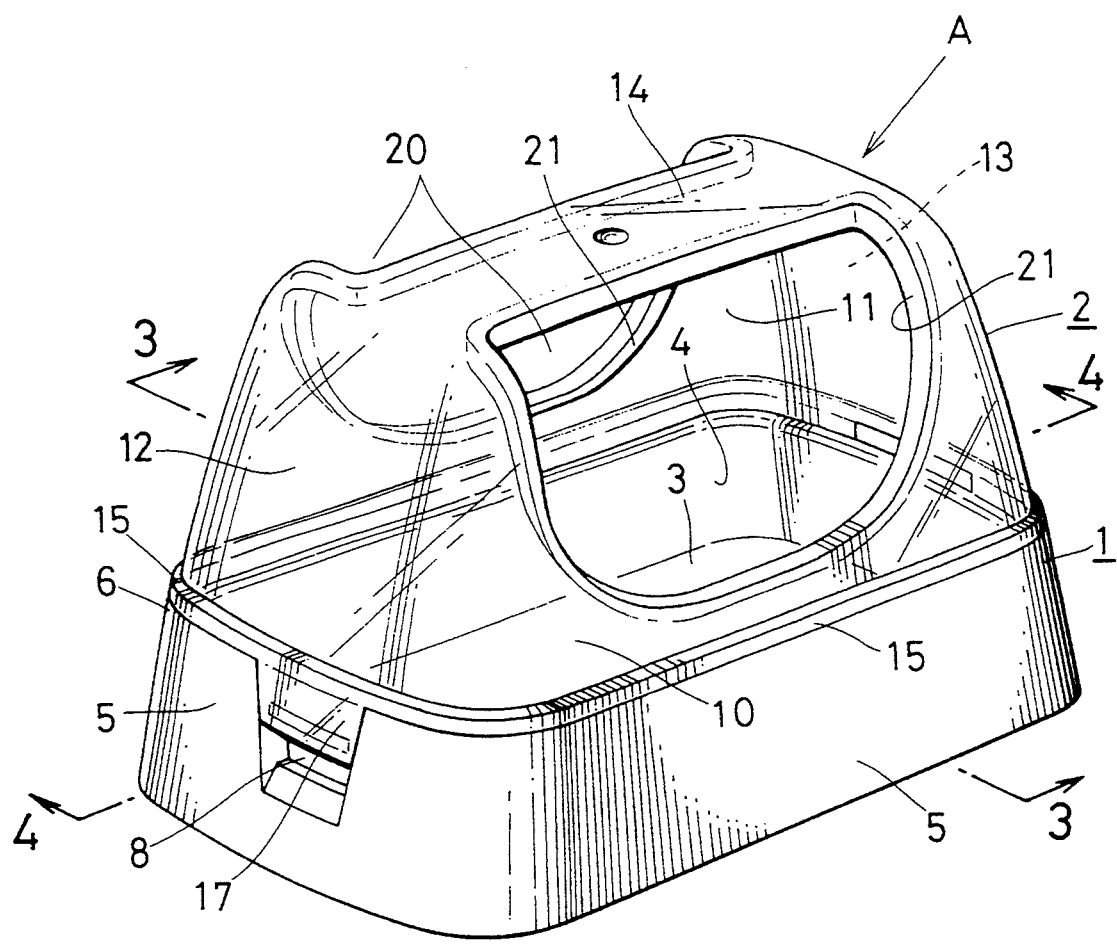
FIG. 2 similarly is a perspective view of the toilet, with its cover attached to the base.

The box-shaped toilet 'A' comprises a base 1 and a cover 2 attachable thereto as shown in FIG. 1.

The base 1 one-piece molded of a hard plastics and having an open top is box-shaped to accommodate sand or a matting 'B'. The one-piece molding of the base 1 is possible on a mass scale and at a reduced cost. In order for any excreted wastes not to be seen through the base, it may preferably be made of an opaque and hard plastics.

The base comprises a bottom 3 generally rectangular in plan view, an inner peripheral wall 4 standing upright from a brim of the bottom, and an outer peripheral wall 5. The outer wall 5 extends outwardly and slanted from a summit of the inner wall 4, beyond a lower surface of the bottom 3. Such a flared shape of the outer wall 5 renders the base stable on a floor of a breeding cage.

It will be desirable sometimes to cause a hamster 'C' to take its excreting pause in and longitudinally of the base 1. Therefore, it may preferably be elongate in one direction and has a suitable inner length and inner width that are greater than those of the hamster. For example, the base is about 12 cm long, 7 cm wide and 3 cm deep in the present embodiment.

A peripheral shoulder 7 is an inside portion of, and extends along an upper rim 6 of the base 1. This shoulder will engage with a lower rim 15 of the cover 2, in a manner described below.

Figure 3:
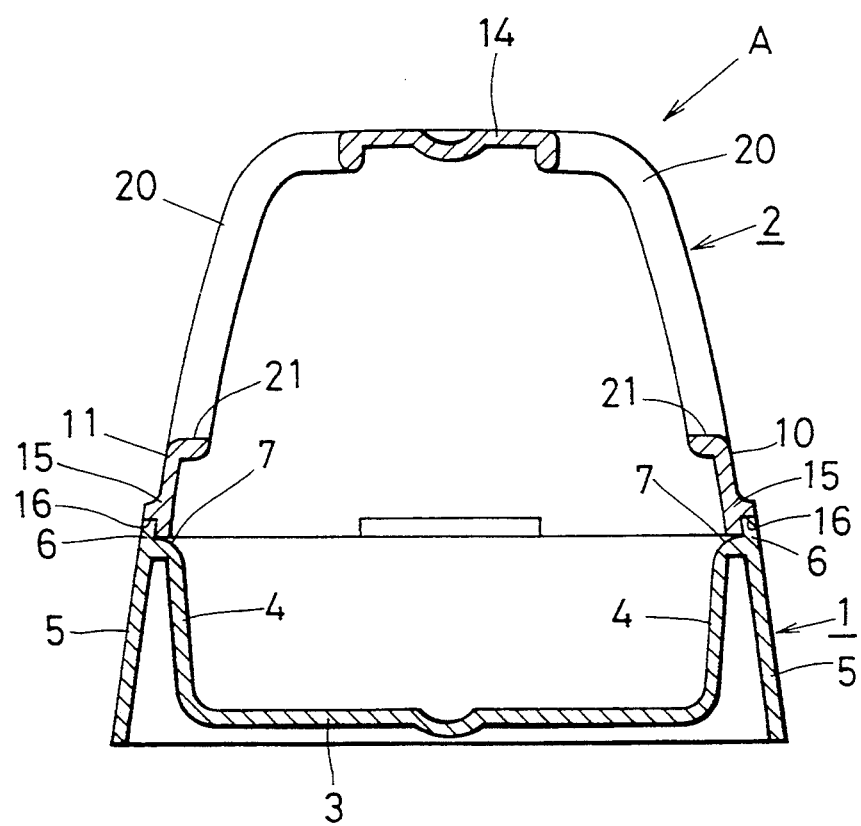
FIG. 3 is a cross section taken along the line 3—3 in FIG. 2.

The shoulder 7 does curve towards the bottom 3, in cross section as shown in FIG. 3, to thereby provide an arcuate plane. A portion of the sand is likely to drop onto the shoulder, when placing the sand or matting 'B' in or taking it out of the base 1 together with any excreted waste. The portion however hardly stays on such a curved shoulder 7. Even if it tends to do so, it will slip down readily by shaking the base 1. The sand or the like 'B' will not intervene between the upper rim 6 of the base 1 and the lower rim 15 of the cover 2. Thus, the base will surely fasten the cover. An inclined plane providing the same effect as the arcuate plane may substitute for it to form the shoulder 7.

Figure 4:
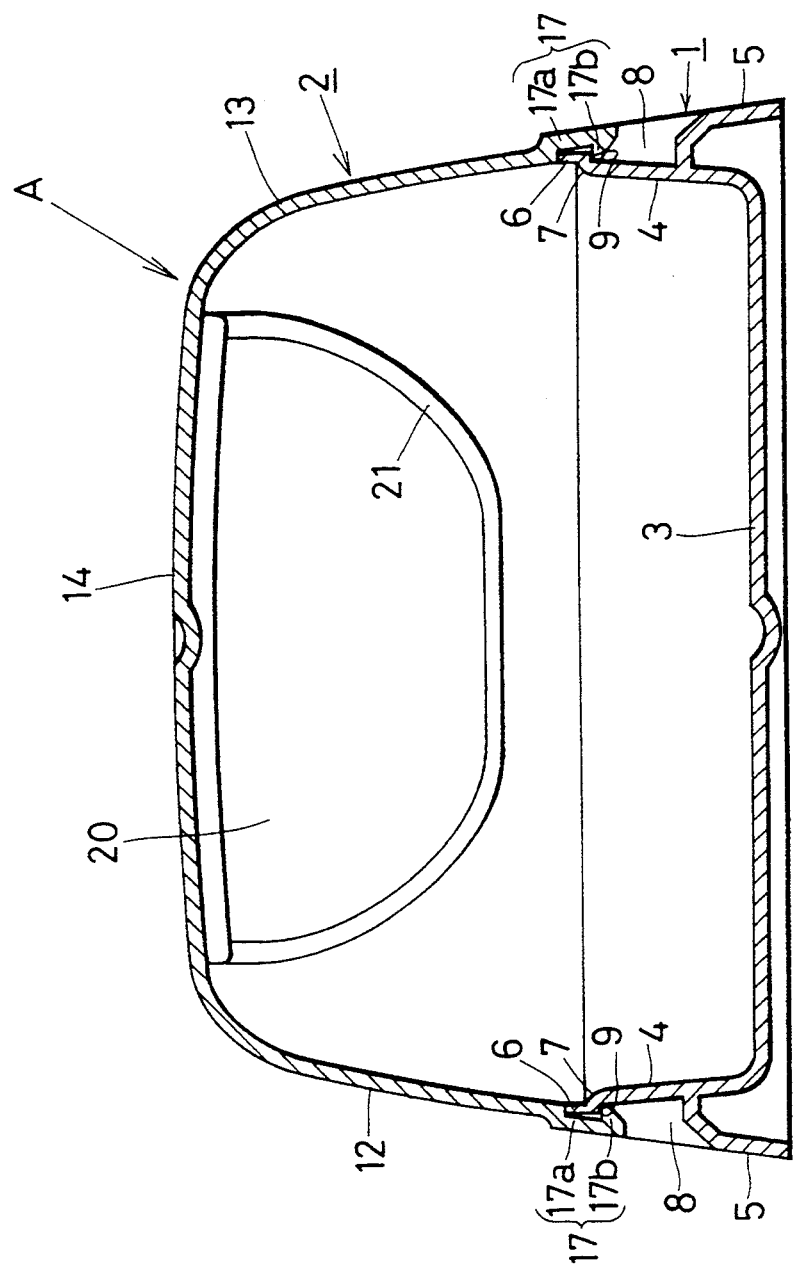
FIG. 4 also is a cross section taken along the line 4—4 in FIG. 2.
Figure 5:
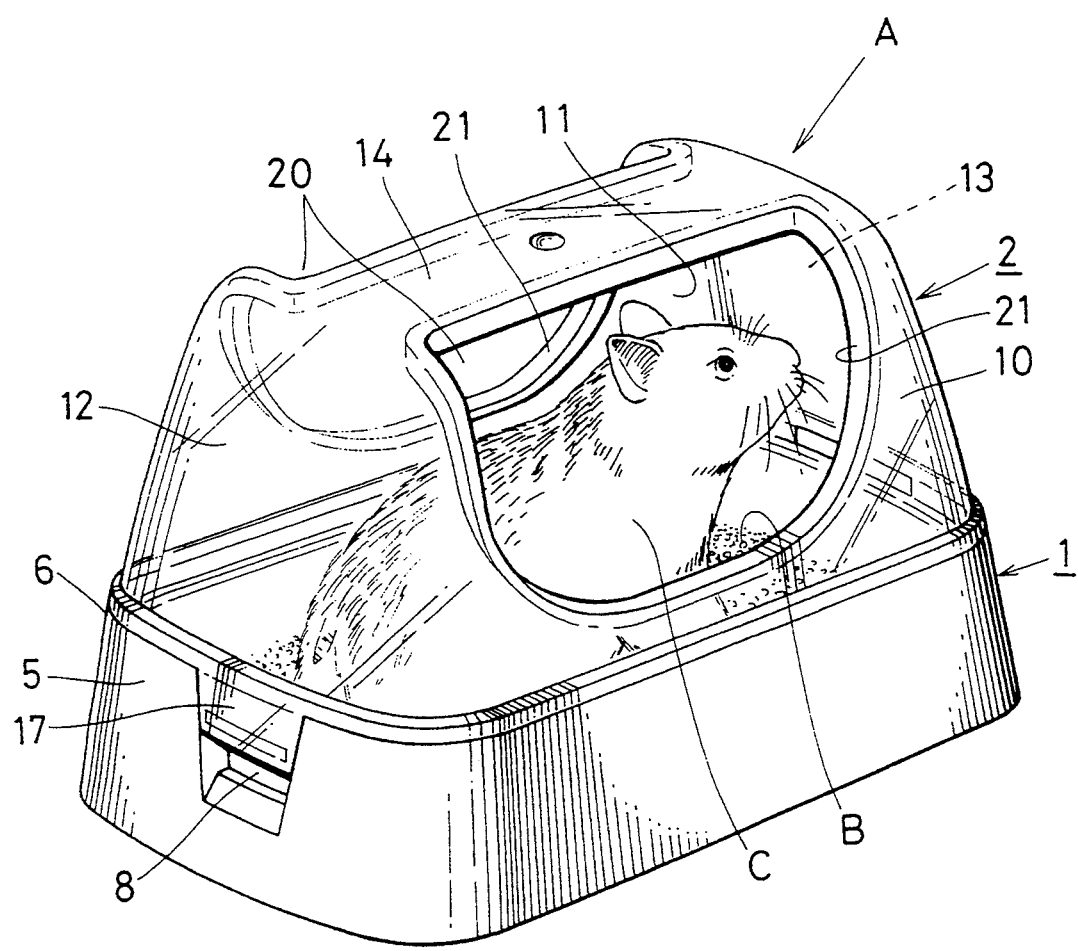
FIG. 5 is a perspective view corresponding to FIG. 2 and showing the toilet in its entirety and in use.

FIGS. 1 and 4 show that a pair of opposite shorter sides of the base 1 have outer and middle wall portions 8 of a given horizontal width and each recessed inwardly. Those recessed portions 8 extend from the upper rim and terminate at a middle height of the outer wall. An upper end of each recessed portion is stepped outwardly to provide a locking portion 9.

The cover 2 one-piece molded of a hard plastics is generally box-shaped and having an open bottom. A space formed between the base 1 and this cover 2 fitted thereon. is for accommodation of the hamster 'C'. The one-piece molding of the cover 2 is also adapted to mass production thereof at a reduced cost.

This cover 2 comprises a pair of opposite and longer side walls 10 and 11, and a pair of front and rear shorter walls 12 and 13. A top 14 extends between and connects the upper ends of these walls 10–13 one to another. All the walls 10–13 are inclined inwardly and upwardly to substantially be flush with the outer peripheral wall 5 of the base 1 when fitted thereon.

A shoulder 16 of a shape complementary with the shoulder 7 of the base 1 extends integral with and along the lower rim 15 of the cover 2. The shoulders 16 and 7 are tightly engageable with each other.

The cover 2 must be of a size such that it cooperates with the base 1 to provide the space for hamster 'C', when fitted on the base Thus, the cover 2 has a length and width corresponding to those of the base 1, and is 5 cm high. They 1 and 2 will form a substantially rectangular parallelepiped that is about 12 cm long, 7 cm wide and 8 cm high, This is a specified size for the hamster, and therefore may be changed for other types of the animals.

Protruding from and integral with lower ends of the shorter walls 12 and 13 of the cover 2 are lockable portions 17. These portions are releasably engageable with the locking portions 9 of the base 1. Each lockable portion 17 comprises an ear 17a and a pawl 17b.

The shoulder 16 formed in the rim 15 of the cover 2 will engage with the shoulder 7 formed in the rim 6 of the base, when setting the cover 2 on the base 1. At the same time, the pawls 17b reversibly click over the respective locking portions 9.

The base 1 and the detachably attached cover 2 form in this manner an integral box, usable as the box-shaped toilet 'A'. Therefore, the toilet can easily be placed in and taken out of the breeding cage. The cover 2 is detachable from the base 1 so that the sand or the like matting 'B' is easily put in the base. Further, with the cover taken off, then the breeder will be able to easily discard the excreted waste together with the matting or to clean the whole toilet.

In use, the hamster 'C' may occasionally dig or kick its solid waste and/or the matting 'B' in the toilet. However, the cover 2 covering the base 1 will prevent them from being scattered outside.

Openings 20 and 20 formed through the cover 2 serve as entrances and exits for the hamster 'C'.

Each opening 20 cuts out a major portion of the longer side wall 10 or 11 and further extends to a side portion of the top 14. Each opening 20 is surrounded by a bank whose major portion located in the side wall is of a broad U-shape, in side elevational view.

A lower end of the bank surrounding the opening is about 1 cm high above the lower end of cover 2. Therefore, the lower end is about 5 cm high above the lower end of base 1. Each opening is about 8 cm wide at its upper end. It is a matter of course that such a dimension of the openings 20 has to match the size of hamsters 'C'.

A minor portion of each opening 20 is a cutout of the top 14, and is of a bottom-opened rectangular shape. A narrow strip between the bank portions surrounding the openings and located on the top 14 may serve as a handle when carrying the box-shaped toilet.

As described above, the openings 20 not only serve as the entrances and exits for the hamsters but also are usable as hand insertion holes.

The hamster 'C' can conveniently enter and leave the box-shaped toilet 'A' from either side, if the openings 20 are present in both the opposite side walls 10 and 11. This feature is convenient also to the breeder, because his or her hand inserted through both the openings can firmly grip the handle.

Alternatively, one opening 20 may be formed solely in one of the opposite walls 10 or 11. The hamster or other pet animals can also enter and leave the toilet through the single opening. The breeder may also use it as the hand insertion hole.

Thus, the opening or openings 20 may be in either or both the side walls 10 and 11 extending longitudinally of the toilet 'A'. As noted above, the toilet is of such a dimension and shape that the hamster 'C' is forced to take an excreting position longitudinally of the toilet. Therefore, the waste or the matting 'B' that the hamster may dig and kick will fly only in a longitudinal direction. Since the other walls 12 and 13 extending perpendicular to the longitudinal direction of the toilet are solid walls having no openings, the waste will not be thrown out of the toilet.

The openings 20 may be present in the front and rear walls 12 and 13 or other regions, if designed effective to avoid the outward scattering of the waste and/or matting.

In the present embodiment, a bank-shaped rim 21 each surrounding the opening 20 protrudes inward. The rim 21 will act as a barrier stopping the excreted waste and/or the matting 'B' that the hamster 'C' may dig or kick within the toilet 'A'.

Depending on the size and position of each opening 20, the rim 21 need not extend all around the opening but may merely extend along only a lower half of the brim thereof. The bank-shaped rim 21 may be dispensed with, if the openings 20 are almost perfect to prevent the waste or the like from being scattered, the bank-shaped rim 21 may be dispensed with.

The cover 2 may desirably be made of a transparent or translucent hard plastics which allows the breeder and anybody else to see the hamster 'C' through the cover.

In use, the cover 2 will be urged towards the base 1 so that the lockable pawls 17b of the former click over to be caught by the locking portions 9 of the latter. Before or after this operation, the sand or matting 'B' will be put in the base, before using the toilet 'A'. Such an assembled toilet will then be placed in a breeding cage or the like not shown.

Figure 6:
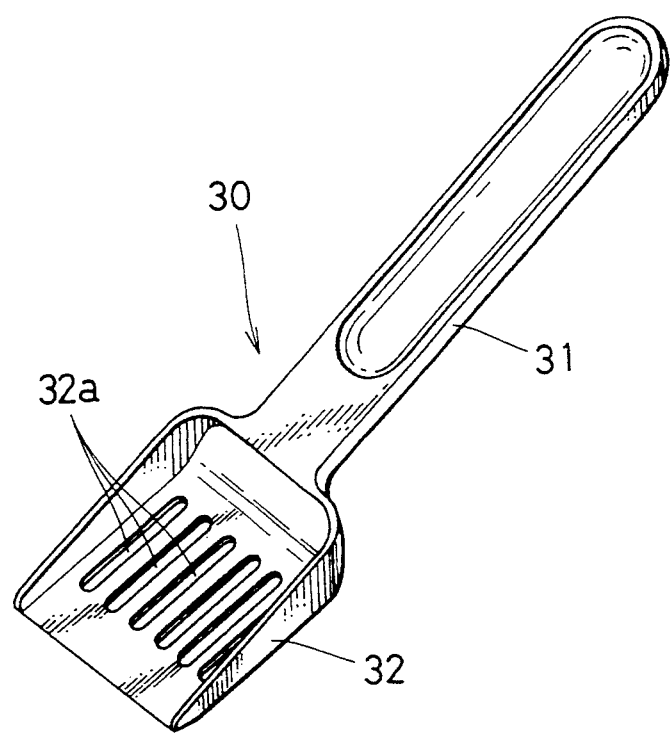
FIG. 6 shows a tool that is for a convenient use in combination with the box-shaped toilet to put away any body waste egested by an animal.

The hamster 'C' will enter the toilet through the openings 20 and then excrete its body waste. This waste may be removed later by the breeder using a spoon or the like. However, a tool 30 specially designed in a manner shown in FIG. 6 may be more preferable than the existing one. This tool 30 comprises a handle 31 and a shoveling portion 32 that continues from and integral with the handle. The shoveling portion 32 having longitudinal slits 32a is capable of being inserted and withdrawn through either opening 20. That portion 32 is of a size and shape adapted to shovel the waste together with the sand 'B'. When removing the waste, an excessive amount of sand escaping from the shoveling portion 32 through its slits 32a will return to the floor of this toilet. Width of each slit 32a is preferably 2-3 mm, to remove only the waste.

The renewing of the whole matting or sand 'B' in the toilet 'A' and the general cleaning of it can be carried out easily by detaching the cover 2 from the base 1.

The box-shaped toilet in this embodiment is suited not only for hamsters but also for any other pet animals such as mice, rabbits, cats, dogs and the like.

Further, the box-shaped toilet may be modified as to its shape and/or size so that another pet animal larger or smaller than hamsters can use it.

The preferred embodiments described herein are therefore illustrative and not restrictive. The scope of the invention is indicated by the appended claims, and all variations coming within the meaning of the claims are intended to be embraced therein.

What is claimed is:

1. A box-shaped toilet for allowing pet animals to excrete therein their body waste, the toilet comprising:
    a combination of a base with a cover;
    the base being a box-shaped and one-piece molded of a hard plastics, said base having an open top surrounded by an upper rim;
    the cover being one-piece molded of a hard plastics, having an open bottom surrounded by a lower rim, and a top;
    the cover being of a cubic shape such that a space for accommodation of the animals is defined between the base and the cover, wherein the lower rim closely engages with the upper rim of the base, said cover having a first and second pair of opposite walls connected by said top of said cover;
    at least one locking portion possessed by the base;
    at least one locking portion possessed by the cover and engageable with and disengageable from the locking portion so that the cover is detachably attached to the base;
    openings formed through at least one of said first and second pairs of opposite walls of the cover, so that the animals are allowed to enter and leave the toilet through the openings, wherein each of said openings is surrounded by a bank-shaped rim that protrudes inwardly;
    handle means for carrying the box-shaped toilet, said handle means formed in said top of said cover by said openings in said at least one pair of opposite walls of said cover, said handle means comprises a narrow strip extending across said top of said cover between said bank-shaped rims of said openings; and
    whereby said openings are hand insertion holes for firmly holding said handle means.

2. A box-shaped toilet as defined in claim 1, wherein the cover has a lower rim fittable on an upper rim of the base.

3. A box-shaped toilet as defined in claim 2, wherein a shoulder is formed integral with the upper rim of the base and closely engageable with a further shoulder integral with the lower rim of the cover.

4. A box-shaped toilet as defined in claim 3, wherein the shoulder of the base is arcuate in cross section.

5. A box-shaped toilet as defined in claim 1, wherein the space is elongate so that the animal can take its position longitudinally of the space.

6. A box-shaped toilet as defined in claim 1, wherein the openings are formed through a pair of opposite walls of the cover.

7. A box-shaped toilet as defined in claim 1, wherein the bank-shaped rim extends fully around the opening.

8. A box-shaped toilet for allowing pet animals to excrete therein their body waste, the toilet comprising:
    a base having a first, a second, a third and a fourth side, said base having an open top surrounded by an upper rim, said first and third sides being in spaced opposite relation to one another, said second and fourth sides being in spaced opposite relation to one another;
    a cover having an open bottom surrounded by a lower rim, a top, and a first, a second, a third and a fourth wall connected by said top of said cover, said first and third walls being in spaced opposite relation to one another and forming a first pair of oppositely disposed walls, said second and fourth walls being in spaced opposite relation to one another and forming a second pair of oppositely disposed walls, said cover being of a cubic shape such that a space for accommodation of the animals is defined between said base and said cover when said cover is placed on said base, wherein the lower rim of said cover closely engages with said upper rim of said base when said cover is placed on said base;
    locking means disposed in said base and said cover, said locking means comprises:
        at least one recessed portion centrally disposed in at least one of said sides of said base, said recessed portion having an outward flange extending perpendicularly from said side and being adjacent said upper rim;
        at least one protrusion centrally disposed in one of said walls of said cover and integrally formed in said cover, said protrusion extending below said lower rim and having a lower end, said lower end having an inward pawl disposed thereon; and
        wherein when said cover is placed on said base, said inward pawl on said protrusion engages said outward flange in said recessed portion such that said protrusion passes over said outward flange and said inward pawl snaps under said outward flange thereby securing said cover to said base;
    openings formed through at one of said first and second oppositely disposed walls of said cover, said openings having a bank-shaped rim that protrudes inwardly and surrounds each of said openings;
    handle means for carrying the box-shaped toilet, said handle means formed from said top of said cover by said openings in said at least one of said pairs of opposite walls of said cover, said handle means comprises a narrow strip extending across said top of said cover between said bank-shaped rims of said openings; and
    whereby said openings are hand insertion holes for firmly holding said handle means.

9. A box-shaped toilet as defined in claim 8, wherein each of the base and the cover is an integral piece made of a hard plastics.

10. A box-shaped toilet as defined in claim 9, wherein the plastics from which the cover is molded is transparent or translucent such that any breeder or viewer can easily observe the inside of the toilet through the cover.

11. A box-shaped toilet as defined in claim 9, wherein the plastics from which the base is molded is opaque such that any breeder or viewer cannot observe the inside of the toilet through the base.

* * * * *